United States Patent
Jiang et al.

(10) Patent No.: US 9,712,232 B2
(45) Date of Patent: Jul. 18, 2017

(54) APPARATUS AND METHOD FOR OTDR TRANSMITTER NOISE COMPENSATION

(71) Applicant: Huawei Technologies Co., Ltd., Shenzhen (CN)

(72) Inventors: Zhiping Jiang, Kanata (CA); Demin Yao, Kanata (CA); Xiaodong Luo, Chengdu (CN); Yansui Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 14/872,484

(22) Filed: Oct. 1, 2015

(65) Prior Publication Data

US 2016/0277101 A1 Sep. 22, 2016

Related U.S. Application Data

(63) Continuation of application No. PCT/CN2015/074306, filed on Mar. 16, 2015.

(51) Int. Cl.
*H04B 10/071* (2013.01)
*G01M 11/00* (2006.01)
*H04B 10/077* (2013.01)

(52) U.S. Cl.
CPC ......... *H04B 10/0775* (2013.01); *G01M 11/00* (2013.01); *H04B 10/071* (2013.01)

(58) Field of Classification Search
CPC combination set(s) only.
See application file for complete search history.

(56) References Cited

U.S. PATENT DOCUMENTS

| 2004/0208501 A1 | 10/2004 | Saunders et al. |
| 2004/0208507 A1 | 10/2004 | Saunders et al. |
| 2004/0208523 A1 | 10/2004 | Carrick et al. |

(Continued)

FOREIGN PATENT DOCUMENTS

| WO | 0247293 A1 | 6/2002 |
| WO | 2009040144 A1 | 4/2009 |

OTHER PUBLICATIONS

Takushima, et al., "Optical reflectometry based on correlation detection and its application to the in-service monitoring of WDM passive optical network," Optical Society of America, vol. 15, No. 9, Apr. 30, 2007, 9 pages.

*Primary Examiner* — David Payne
*Assistant Examiner* — Omar S Ismail
(74) *Attorney, Agent, or Firm* — Slater Matsil, LLP

(57) ABSTRACT

An optical device with integrated Optical Time Domain Reflectometer (OTDR) functionality and method for the same is provided. The optical device includes a transmitter and an Optical Time Domain Reflectometer (OTDR) module, The transmitter is configured to generate an Optical Time Domain Reflectometer (OTDR)-modulated optical supervisory channel (OSC) signal by applying an OTDR modulation to an optical supervisory channel (OSC) signal using an OTDR signal and to transmit the OTDR-modulated OSC signal. The OTDR module is configured to generate the OTDR signal, to monitor a returned light signal, to determine transmitter noise compensation information, and to generate OTDR trace information using transmitter noise compensation information and the monitored returned light signal.

20 Claims, 9 Drawing Sheets

(56) References Cited

U.S. PATENT DOCUMENTS

| | | | |
|---|---|---|---|
| 2011/0013904 A1* | 1/2011 | Khermosh | G01M 11/3118 398/16 |
| 2013/0202287 A1* | 8/2013 | Joffe | G01M 11/3145 398/13 |
| 2014/0009763 A1* | 1/2014 | Bao | G01N 21/55 356/447 |
| 2014/0072306 A1* | 3/2014 | Sridhar | H04B 10/071 398/79 |
| 2014/0077971 A1* | 3/2014 | Archambault | H04Q 9/00 340/870.04 |
| 2014/0328583 A1 | 11/2014 | Al et al. | |

* cited by examiner

APPARATUS AND METHOD FOR OTDR TRANSMITTER NOISE COMPENSATION

This application is a continuation of PCT Application No. PCT/CN2015/074306 filed on Mar. 16, 2015, which application is hereby incorporated herein by reference.

TECHNICAL FIELD

This invention relates to optical transmission systems and, in particular, to an Optical Time Domain Reflectometer (OTDR) for optical fiber verification and characterization.

BACKGROUND

Optical Time Domain Reflectometers (OTDRs) have been widely used for verification of performance characteristics of optical networks. To obtain OTDR measurements, a series of OTDR pulses are injected into optical fibers under test, and returned light from the optical fibers is measured as a function of time. Using the OTDR measurements, fiber problems (e.g., fiber loss, fiber cut) can be localized. Conventionally, standalone OTDR equipment with dedicated components have been utilized to perform the OTDR measurements. However, the dedicated components lead to increased size and cost, and limit the capability to easily deploy and test fiber spans. Integration of OTDR with other optical components may meet these challenges. However, the integration of OTDR with other optical components is difficult because noise from the other components may interfere with the OTDR measurements. Therefore, there is a need to provide improved OTDR functionality.

SUMMARY

In accordance with an aspect of the disclosure there is provided a device having a transmitter configured to generate an OTDR-modulated optical supervisory channel (OSC) signal by applying an Optical Time Domain Reflectometer (OTDR) modulation to an optical supervisory channel (OSC) signal using an OTDR signal; and transmit the OTDR-modulated OSC signal through an optical fiber. The device also includes an OTDR module configured to generate the OTDR signal, to monitor a returned light from the optical fiber, to determine transmitter noise compensation information, and to generate OTDR trace information using the noise compensation information and the modified returned light.

In accordance with another aspect of the disclosure there is provided a method that entails applying an Optical Time Domain Reflectometer (OTDR) modulation to an optical supervisory channel (OSC) signal to generate an OTDR-modulated OSC signal, transmitting through an optical fiber the OTDR-modulated OSC signal, monitoring a returned light signal from the optical fiber, and determining transmitter noise compensation information to generate OTDR trace information using the noise compensation information and the monitored returned light signal.

In accordance with another aspect of the disclosure there is provided a non-transitory computer readable memory containing instructions which when executed by a processor cause the device to apply an Optical Time Domain Reflectometer (OTDR) modulation to an optical supervisory channel (OSC) signal using an OTDR signal to generate an OTDR-modulated OSC signal; transmit the OTDR-modulated OSC signal through an optical fiber, monitor a returned light signal from the optical fiber, and determine transmitter noise compensation information to generate OTDR trace information using the transmitter noise compensation information and the monitored returned light signal.

BRIEF DESCRIPTION OF THE DRAWINGS

For a more complete understanding of this disclosure, reference is now made to the following brief description, taken in connection with the accompanying drawings and detailed description.

DETAILED DESCRIPTION OF ILLUSTRATIVE EMBODIMENTS

Optical devices having integrated OTDR and related methods for compensating for transmitter noise are described below, by way of example only, with reference to FIGS. 1-10. In the present disclosure, OTDR functionalities are integrated within a module for Optical Supervisory Channel (OSC) applications, which may be an OSC transmitter or OSC transceiver. The OTDR and OSC applications share the same light source(s), and may be substantially simultaneously performed. Transmitter noise compensation extends the dynamic range of OTDR measurement, thereby enabling more distant fault detection in optical fiber communication links.

Figure 1:
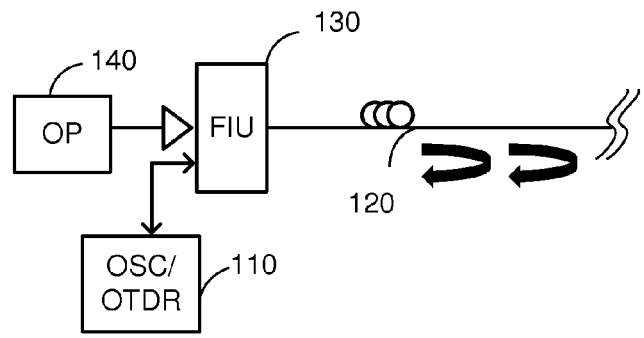
FIG. 1 is a schematic diagram of an optical device with integrated OTDR in an optical network.

FIG. 1 illustrates an optical device 110 with integrated OTDR in an optical network 100. The optical device 110 includes a transmitter with OTDR circuitry integrated therein, which is communicatively coupled to the optical network 100. For example, the transmitter may be an OSC transmitter or an OSC transceiver. The transmitter includes a light source (e.g., laser diode) for providing OSC signals. In one example, the light source includes an OSC laser (e.g., laser diode) and a module for modulating the output of the OSC laser. The optical device 110 uses the light source to implement OSC applications. For the OSC applications, the OSC signals may carry operational, administrative, maintenance, and/or provisioning information (e.g., software upgrades of network elements). The optical device 110 also uses the light source for OSC to transmit an OTDR signal.

In one implementation, the optical device 110 generates an OTDR signal and applies an OTDR modulation to an OSC signal using the OTDR signal. The OTDR signal may use any known codes, such as complementary Golay codes. The OSC signal with the OTDR modulation is transmitted from the optical device 110 and is fed into an optical fiber under test (e.g., optical fiber 120). The optical device 110 uses the OSC signal with the OTDR modulation to monitor fiber loss events in the optical fiber under test. The events may include Fresnel reflection and/or Rayleigh backscattering. The optical device 110 generates OTDR trace information using a returned light signal r(t) from the optical fiber under test. The OTDR trace information includes the trace of the power of the returned light signal r(t). The OTDR trace provides information quantifying the extent of Fresnel reflection and Rayleigh backscattering. The OTDR circuitry is configured to compensate for transmitter noise (e.g., OSC data, OSC laser noise) to generate the OTDR trace information. The OSC data rate (e.g. 155 Mbps) is higher than the OTDR bit rate (e.g. 1 Mbps). Each OTDR bit thus may contain some number of OSC data bits. OSC data behaves like noise for OTDR. In the implementation, the optical device 110 measures the transmitter optical signal that is output from the transmitter to implement the transmitter noise compensation.

The optical device 110 may include one or more other components, such as one or more programmable on-board modules, a combination of software components and hardware components, an OSC receiver module, other test or diagnostic components, user interfaces, and components for online monitoring of performance characteristics of optical fibers. The optical device 110 may allow various operation modes of the optical device 110, OSC applications, OTDR applications, and data processing schemes. The user of the optical device 110 may set at least one of parameters for OSC applications and parameters for OTDR applications, including parameters of the OTDR measurement (e.g., modulation index/ratio, pulse sequences, pulse width) via a user interface or network communications. The optical device 110 may be an embedded Optical Time Domain Reflectometer (eOTDR) embedded into an OSC small-form factor pluggable (SFP) transceiver that may be configured to continuously monitor fibers.

In FIG. 1, the optical device 110 is communicatively coupled to the optical fiber 120 via a fiber interface unit (denoted as "FIU") 130. FIU 130 is a coupler for coupling different waveforms. For example, the FIU 130 couples OSC signals and C-band signals. The optical fiber 120 may provide a 155 Mbps data link on which OSC signals may be transmitted. In one example, the optical device 110 is coupled to the FIU 130 at the optical end 140 (denoted as "OP" in FIG. 1) for receiving and interfacing with an optical source or optical fiber span. The arrangement of the optical device 110 is not limited to that shown in FIG. 1. The optical device 110 may be used in any other locations in the optical network 100, such as at every fiber span, at some spans but not every fiber span, at an Optical Line Terminal (OLT), or at an Optical Network Unit (ONU). The optical device 110 may be coupled to computer devices (e.g., servers) for providing or receiving control information and OTDR information.

Figure 2:
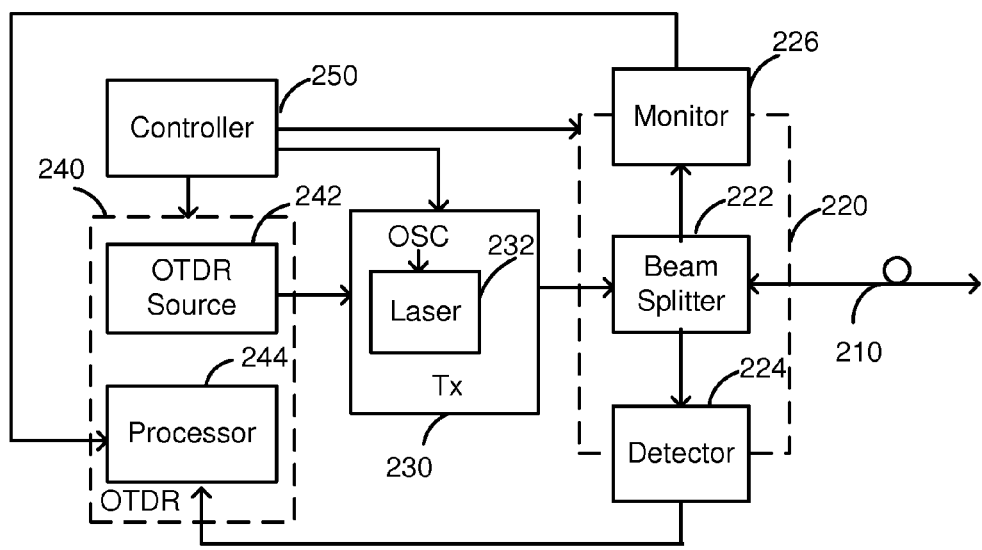
FIG. 2 is a block diagram of a transmitter module with integrated OTDR, which may be an implementation of the optical device of FIG. 1.

FIG. 2 illustrates a transmitter module 200 with integrated OTDR, which may be an implementation of the optical device 110 of FIG. 1. The transmitter module 200 includes an optical module 220. The optical module 220 is communicatively coupled to an optical fiber 210. In one example, the optical fiber 210 is a launch fiber which is communicatively coupled to an optical fiber under test (120 of FIG. 1) via a FIU (130 of FIG. 1). In another example, the optical fiber 210 is a fiber under test in the optical network 100 of FIG. 1.

The optical module 220 includes a beam-splitter 222 (or a directional coupler). The beam-splitter 222 is used for OSC and OTDR applications. In one example, the beam-splitter 222 is a Wavelength Division Multiplexing (WDM) beam-splitter. The beam-splitter 222 is communicatively coupled to the optical fiber 210 and a transmitter (denoted as "Tx" in FIG. 2) 230. The transmitter 230 provides a transmitter optical signal by using a laser unit 232. The transmitter optical signal is fed into the optical fiber 210 using the beam-splitter 222. The laser unit 232 includes an OSC laser. In one example, the OSC laser is a 1510-nm laser although an OSC laser operating at a different wavelength may be utilized. The laser unit 232 may include at least one of a driver for driving the OSC laser and a modulator for modulating the output of the OSC laser.

The transmitter module 200 includes OTDR circuitry for OTDR applications. At least a part of the OTDR circuitry may be integrated into the transmitter 230 or the optical module 220. The OTDR circuitry includes an OTDR measurement module 240 (denoted as "OTDR" in FIG. 2) communicatively coupled to the transmitter 230. The OTDR measurement module 240 includes an OTDR source 242 to provide the OTDR modulation described as OTDR(t). The OTDR source 242 includes a generator for generating OTDR(t). Some examples of codes suitable for use as OTDR(t) are: complementary Golay codes, biorthogonal codes, simplex codes, and CCPONS (Complementary Correlated Prometheus Orthonormal Sequence). The OTDR modulation OTDR(t) is applied to an OSC signal described as OSC(t). The result of this modulation shall be referred to herein as an "OTDR-modulated OSC signal". The transmitter optical signal (i.e. the signal that is transmitted by the transmitter 230) thus includes the OTDR-modulated OSC signal. In the implementation, the OTDR modulation is an amplitude modulation. The OTDR modulation OTDR(t) may be provided to a modulator coupled to the output of the laser unit 232 or the driver of the laser unit 232 to generate the OTDR-modulated OSC signal.

The OTDR circuitry includes a detector 224 configured to monitor/detect the waveform of the returned light signal r(t) (i.e. light that reflects, scatters or otherwise returns back to the reflector due to Fresnel reflection and Rayleigh backscattering or any other phenomena) from the optical fiber under test. The returned light signal r(t) is directed to the detector 224 via the beam-splitter 222. In one example, the detector 224 includes a photo-detector for measuring the power of the returned light signal r(t). The returned light signal r(t) is substantially proportional to the transmitted optical signal. The OTDR signal is extractable from the returned light signal by using the correlation operation. Data representing the measurement of the returned light signal r(t) may be recorded in a memory, such as a memory in the OTDR measurement module 240.

The OTDR circuitry optionally includes a monitor 226 configured to monitor/detect the transmitter ("Tx") waveform of the transmitter optical signal output from the transmitter 230, which is used for the transmitter noise compensation. The transmitter optical signal is directed to the monitor 226 via the beam-splitter 222. In one example, the monitor 226 includes a photo-detector for measuring the power of the transmitter optical signal. Data representing the measurement of the transmitter optical signal may also be recorded in a memory, such as the memory in the OTDR measurement module 240.

The OTDR measurement module 240 includes a data processor 244. The data processor 244 is communicatively coupled to the detector 224 and the monitor 226. The data processor 244 is configured to implement the OTDR measurement, including generation of OTDR trace information. The data processor 244 implements the transmitter noise compensation using the monitored transmitter optical signal. In one implementation of the transmitter noise compensation, the data processor 244 computes a modified code signal c'(t) and recovers a fiber loss function using the modified code signal c'(t), as described in detail below. The data processor 244 may be configured to generate and visually display the OTDR trace information using the fiber loss function.

The operation of the transmitter module 200 is controlled using a controller 250. The controller 250 may be an OSC controller for OSC applications with integrated OTDR circuitry. The controller 250 may control various parameters of the transmitter module 200, such as operation modes, OSC applications, or OTDR applications including OTDR measurements and OTDR modulations (e.g. timing, code sequences, pulse width, modulation index/ratio).

In one implementation, the transmitter module 200 has a plurality of operating modes, such as an OSC mode and a correlation mode. In the OSC mode, OSC data without the OTDR modulation is transmitted from the transmitter module 200. In the correlation mode, OSC data with the OTDR modulation is transmitted from the transmitter module 200. In this particular implementation, the detector 224 and the monitor 226 operate only in the correlation mode. In another implementation, the transmitter module 200 can operate in the correlation mode but not in the OSC mode.

Figure 6A:
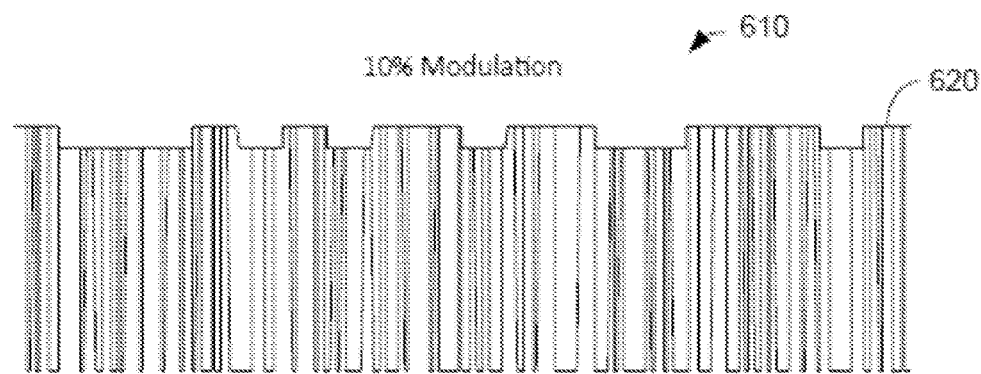
FIG. 6A illustrates an example of a waveform of an OTDR-modulated OSC signal with 10% OTDR modulation.
Figure 6B:
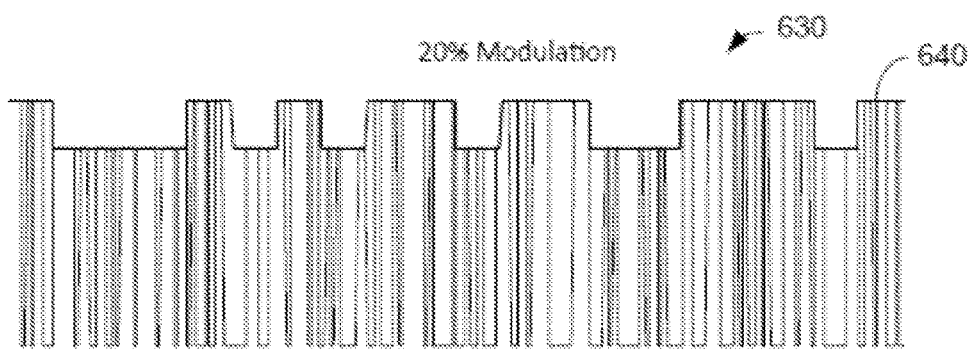
FIG. 6B illustrates an example of a waveform of an OTDR-modulated OSC signal with 20% OTDR modulation.
Figure 6C:
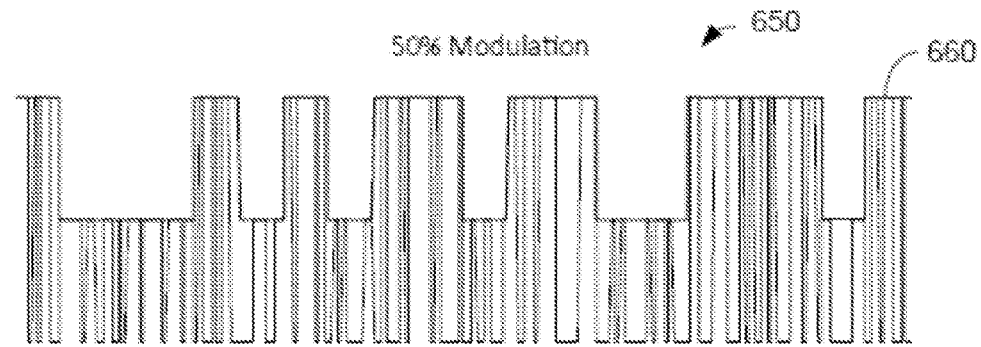
FIG. 6C illustrates an example of a waveform of an OTDR-modulated OSC signal with 50% OTDR modulation.

In one implementation, the transmitter 230 is configured to generate a an OTDR-modulated OSC signal having a waveform described as (1+OTDR(t))*OSC(t) in which * is the multiplication operator, and the OTDR modulation OTDR(t) is superimposed on OSC(t), as shown by way of example in FIGS. 6A-6C. The OTDR-modulated OSC signal carries OSC and OTDR information. The OTDR-modulated OSC signal is fed to the optical fiber under test (e.g., the optical fiber 210) via the beam-splitter 222.

The amplitude modulation OTDR(t) reduces the effective amplitude of the OSC modulation of the OSC data which, in turn, may degrade the OSC performance (e.g. its fault-detecting sensitivity). The transmitter module 200 therefore sets the OTDR modulation OTDR(t) to balance the relative signal strengths of the OTDR component and the OSC component to avoid degradation of the OSC component by the OTDR component. In one implementation in which the transmitter 223 generates the OTDR-modulated OSC signal (1+OTDR(t))*OSC(t), the transmitter module 200 adjusts or normalizes the amplitude of OTDR(t). For example, the amplitude of OTDR(t) is adjusted or normalized such that an OTDR modulation ratio K is equal to or less than a threshold. In one implementation, the OTDR modulation ratio is defined as K=[max (OTDR(t))−min (OTDR(t))]×100, where the amplitude is measured in units such that the peak-to-peak amplitude of OSC(t)=1. A large K value means that the OTDR signal OTDR(t) is stronger relative to the original OSC signal OSC(t) and may thus interfere with the OSC operation. Accordingly, the OTDR modulation ratio K may be adjusted such that OSC performance (sensitivity) is insubstantially deteriorated by the presence of the OTDR signal. When OSC is chosen such that the "1" level in amplitude is 1, and the "0" level in amplitude is 0, the OSC "1" level becomes 0.8 to meet the OTDR modulation ratio K=20%. Therefore, the effective amplitude is reduced to 0.8 from 1. In one example, the OTDR modulation ratio K is set to a value that is less than 50%, such as 20%-30%. Setting the OTDR modulation rate K, i.e. normalization of OTDR (t), may be configured by the controller 250, the OTDR circuitry (e.g., data processor 244), user interfaces or a combination thereof.

Figure 3:
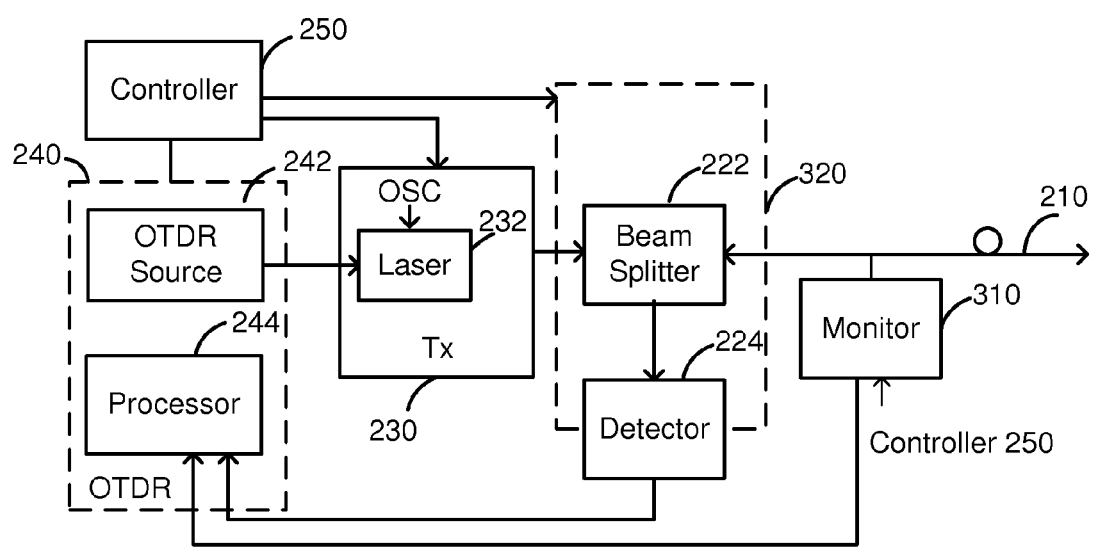
FIG. 3 is a block diagram of another example of a transmitter module with integrated OTDR, which may be an implementation of the optical device of FIG. 1.

In the embodiment depicted by way of example in FIG. 2, the monitor 226 is located internally to the optical module 220. The arrangement of the monitor 226 is not limited to that shown in FIG. 2. The monitor 226 may be located at any position external to the optical module 220 or external to the optical device 110. For example, as shown in FIG. 3, a monitor 310 for monitoring the transmitter optical signal of the transmitter 230 may be located externally to an optical module 320 of a transmitter module 300. The transmitter module 300 shown in FIG. 3 is similar to the transmitter module 200 of FIG. 2. The optical module 320 may be the same as or similar to the optical module 220. The monitor 310 may be the same as or similar to the monitor 226 of FIG. 2. The remaining elements of FIG. 3 correspond to the similarly named and numbered elements in FIG. 2. The monitor 310 is communicatively coupled to the OTDR measurement module 240.

Referring to FIGS. 2-3, the transmitter modules 200, 300 may be OSC SFP modules with integrated OTDR. The beam splitter 222, the detector 224 and the monitor 226 may be removable from the optical module 220. The beam splitter 222 and detector 224 may be removable from the optical module 320. At least one of the detector 224 and the monitor 226 may be configured to be pluggable to the optical module 220 or 320. The optical modules 220, 320 may be pluggable modules, and may be integrated with at least a part of the transmitter modules 200, 300, respectively. The optical modules 220, 320 may be SFPs, each of which may include a lens between the beam-splitter 222 and the optical fiber 210. The transmitter module 200 or the transmitter module 300 may be a part of an OSC transmitter or an OSC transceiver. The transmitter modules 200, 300 may be SFP transmitters or SFP transceivers. The beam-splitter 222 splits light from the optical fiber to allow the transmitter module to conduct the OTDR measurement at a certain wavelength and also to conduct other operations at different wavelengths. The OTDR circuitry of the transmitter modules 200, 300 may be integrated with circuitry for OSC applications. The transmitter modules 200, 300 or the OTDR circuitry may include one or more on-board modules, which may be programmable. The transmitter modules 200, 300 may include other components, such as an OSC receiver module, other test or diagnostic components, and user interfaces. The transmitter modules 200, 300 may be coupled to network management software. The transmitter modules 200, 300 may include one or more software-programmable elements which may allow various operations including OSC/OTDR applications, setting of various parameters, and any other test or diagnostic applications.

Figure 4:
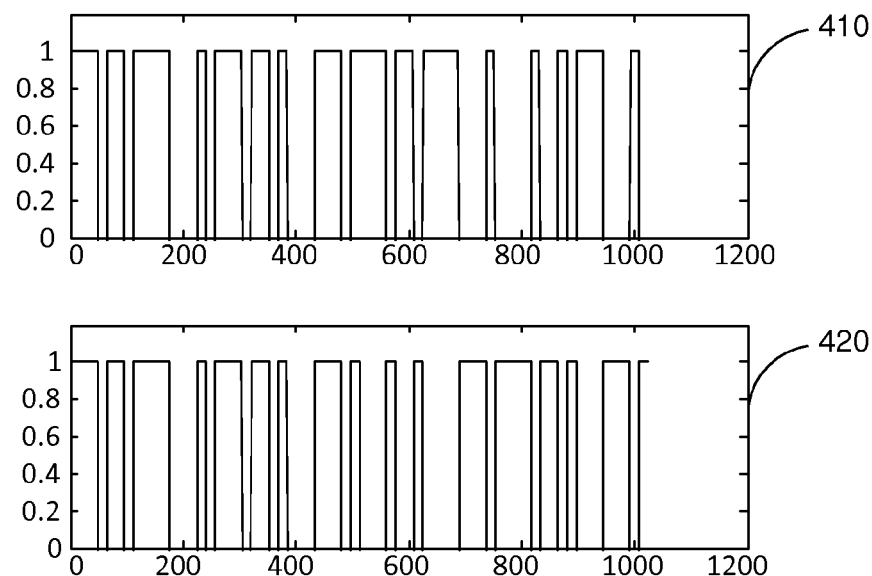
FIG. 4 illustrates waveforms of Golay code sequences.
Figure 5:
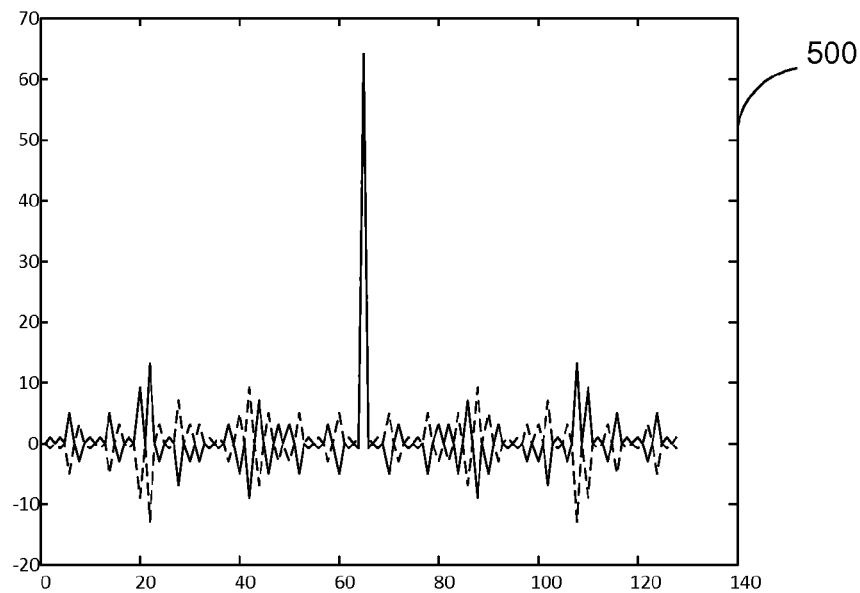
FIG. 5 illustrates a correlation view of the Golay code sequences shown in FIG. 4.

FIG. 4 illustrates an example of a 64-bit complementary Golay code with a sequence 410 and a complementary sequence 420, which may be used by the OTDR source 242 of FIGS. 2-3 as an implementation of the OTDR modulation OTDR(t). Other possible implementations have been discussed above. In FIG. 4, the y-axis represents the amplitude of the code signal, and the x-axis represents the sampling points of the code signal. Each code bit has 16 samples. In one implementation of the OTDR-modulated OSC signal (1+OTDR(t))*OSC(t), the amplitude of the code signal (i.e., OTDR(t)) is adjusted. FIG. 5 illustrates a correlation view 500 of the Golay code sequences 410 and 420 shown in FIG. 4 where the x-axis is the code bit and the y-axis is the correlation result. The central peak location in FIG. 5 corresponds to when two functions of the correlation operation are aligned in time.

FIGS. 6A-6C illustrate examples of waveforms at various OTDR modulation ratios. In FIGS. 6A-6C, the y-axis represents the power of the transmitter optical signal and the x-axis represents time. As shown in FIGS. 6A-6C, the OTDR-modulated OSC signal (1+OTDR(t))*OSC(t) includes the OSC signal, which is a relatively fast-changing signal, and the OTDR signal, which is a relatively slowly changing signal. The transmitter optical signal shown in FIGS. 6A-6C may be generated in the optical device 110 of FIG. 1, the transmitter module 200 of FIG. 2 or the transmitter module 300 of FIG. 3. FIG. 6A illustrates an OTDR-modulated OSC signal 610 in the form of (1+OTDR(t))*OSC(t) with 10% OTDR modulation (K=10) providing OTDR modulation OTDR(t) 620. FIG. 6B illustrates an OTDR-modulated OSC signal 630 in the form of (1+OTDR(t))*OSC(t) with 20% OTDR modulation (K=20) providing OTDR modulation OTDR(t) 640. FIG. 6C illustrates an OTDR-modulated OSC signal 650 in the form of (1+OTDR(t))*OSC(t) with 50% OTDR modulation (K=50) providing OTDR modulation OTDR(t) 660.

One implementation of the transmitter noise compensation technique is described in detail below. For comparison purposes, it is assumed that there is no transmitter noise, and an OTDR transmitter sends out a code signal c(t) that correlates with itself to produce a delta function $\delta(t)$ (i.e., c(t)*c(t)=$\delta$(t): * is the correlation operator). Some suitable examples of the code signal c(t) include: complementary Golay codes, biorthogonal codes, simplex codes, CCPONS (Complementary Correlated Prometheus Orthonormal Sequence). The noise resulting from transmission through the fiber can be represented by the fiber loss function $f(z)$ or $f(t)$, where t=z/($v_g$/2) is the return time in the fiber, and $v_g$ is the group velocity in the fiber. The returned light signal r(t) can be expressed by the convolution of c(t) and $f(t)$ (omitting the scale factor) as shown in Equation (1):

$$r(t)=c(t) \otimes f(t)=\int_0^t c(\tau) f(t-\tau) d\tau \quad (1)$$

where $\otimes$ is the convolution operator.

The fiber loss function can be recovered by the correlation operation of the code signal c(t) and the returned light signal r(t) as follows:

$$c(t)*r(t)=c(t)*(c(t) \otimes f(t))=(c(t)*c(t)) \otimes f(t)=\delta(t) \otimes f(t)=f(t) \quad (2)$$

where * is the correlation operator.

Taking into account transmitter noise, represented by the function d(t), the OTDR transmitter transmits a signal c(t)d(t) instead of c(t) where d(t)≠1. The returned light signal r(t) is expressed by the convolution of c(t)d(t) and $f(t)$, as described in Equation (3):

$$r(t)=(c(t)d(t)) \otimes f(t) \quad (3)$$

Using r(t) as expressed in Equation (3), the convolution of c(t) and the returned light signal r(t) is described as:

$$c(t)*r(t)=c(t)*((c(t)d(t)) \otimes f(t))=(c(t)*(c(t)d(t))) \otimes f(t) \quad (4)$$

c(t)d(t) in Equation (4) can be described in Equation (5):

$$c(t)d(t)=c(t)(1+d(t)-1)=c(t)+c(t)(d(t)-1) \quad (5)$$

As a result, c(t)*r(t) in Equation (4) can be expressed as:

$$c(t)*r(t)=f(t)+\{c(t)*[c(t)(d(t)-1)]\} \otimes f(t) \quad (6)$$

In Equation (6), c(t)*(c(t)d(t))≠$\delta$(t) because d(t)≠1. Due to the last term in Equation (6) the transmitter noise reduces the dynamic range over which the OTDR measurement can be reliably used to detect a fault or imperfection in the fiber. The last term in Equation (6) contributes to a noise floor on the OTDR trace.

In one implementation of the transmitter noise compensation, the transmitter noise is compensated by computing an effective modified code signal c'(t) expressed as Equation (7) and then recovering the fiber function as expressed by Equation (8):

$$c'(t)=c(t)+g'(t) \quad (7),$$

$$c'(t)*r(t)=f(t) \quad (8)$$

To determine g'(t) in Equation (7), g(t) is defined as described in Equation (9):

$$g(t)=c(t)d(t)-c(t) \quad (9)$$

where c(t) is the original transmitter optical signal, c(t)d(t) is the monitored waveform of the output from the transmitter.

Using Equation (7), the left term in Equation (8) can be expressed as follows:

$$c'(t)*r(t)=(c(t)+g'(t))*r(t) \quad (10)$$

Due to the transmitter noise d(t), the returned light signal r(t) in Equation (10) can be expressed by Equation (3). Thus, the right term of Equation (10) is expressed as shown in Equation (11):

$$(c(t)+g'(t))*r(t) = (c(t)+g'(t))*(c(t)d(t)) \otimes f(t) \quad (11)$$
$$= (c(t)+g'(t))*(c(t)d(t)-c(t)+c(t)) \otimes f(t)$$
$$= (c(t)+g'(t))*(g(t)+c(t)) \otimes f(t)$$
$$= (c(t)*g(t)+c(t)*c(t)+g'(t)*g(t)+g'(t)*c(t)) \otimes f(t)$$
$$= (c(t)*g(t)+g'(t)*g(t)+g'(t)*c(t)) \otimes f(t)+f(t)$$

The first term of Equation (11) represents the effect of the transmitter noise. The transmitter noise is thus compensated when the condition expressed in Equation (12) is met:

$$c(t)*g(t)+g'(t)*g(t)+g'(t)*c(t)=0 \quad (12)$$

The modified code c'(t) is determined based on g'(t) that meets the condition expressed by Equation (12). In one implementation, the condition (12) is solved in the frequency domain by using a Fourier transformation, as shown in Equation (13):

$$C(\omega)G^*(\omega)+G'(\omega)G^*(\omega)+G'(\omega)C^*(\omega)=0 \quad (13)$$

where the superscript * in Equation (13) indicates the complex conjugate, g(t) is a known function and computed by Equation (9), G(ω) is the Fourier transform of g(t), G'(ω) corresponds to the frequency domain variable of g'(t), and C(ω) corresponds to the frequency domain variable of c(t).

Using Equation (13), G'(ω) is obtained by Equation (14) as follows:

$$G'(\omega) = -\frac{C(\omega)G^*(\omega)}{G^*(\omega) + C^*(\omega)} \qquad (14)$$

Figure 7:
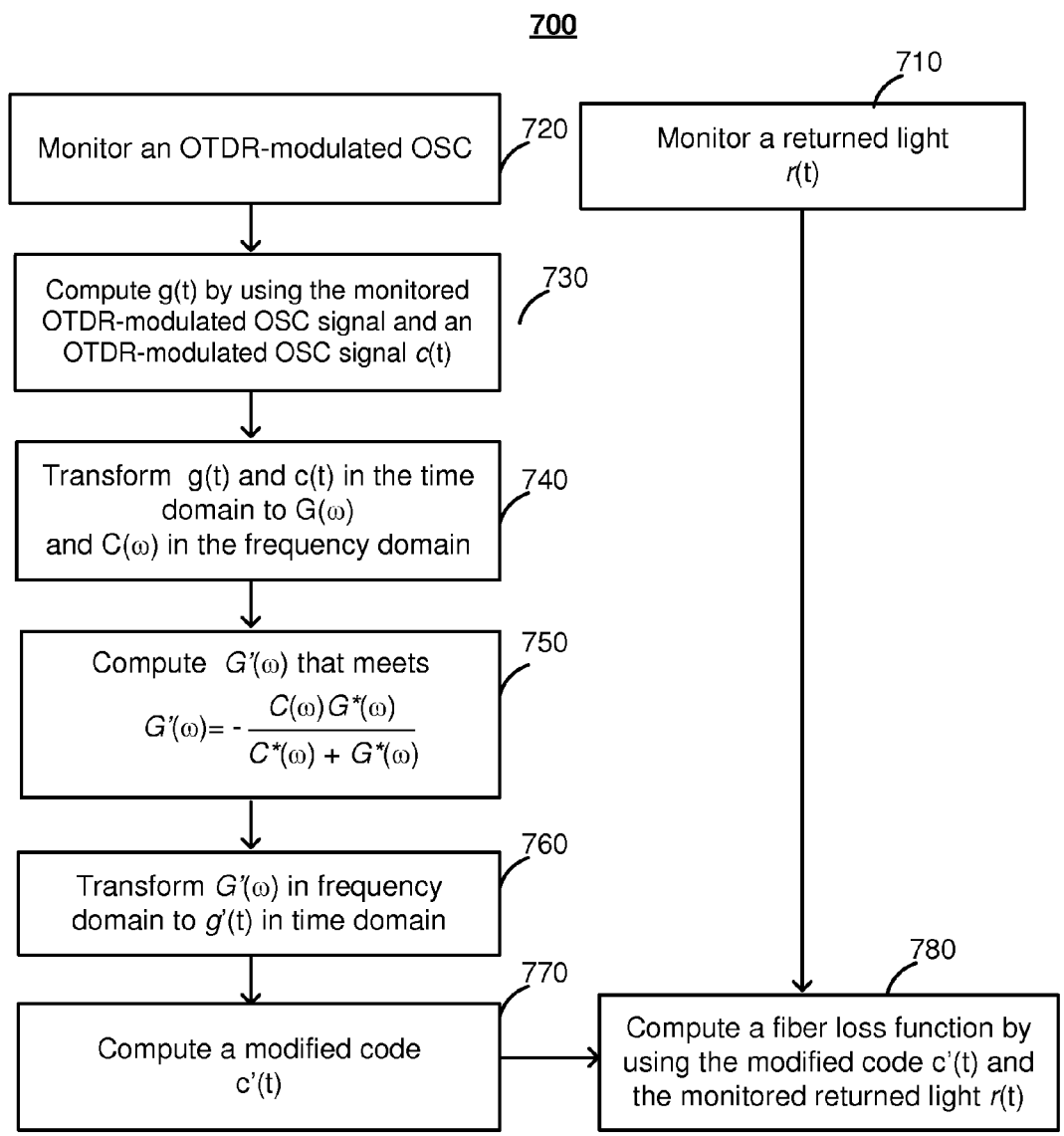
FIG. 7 is a flow diagram showing a transmitter noise compensation method.

FIG. 7 illustrates a transmitter noise compensation method 700. The transmitter noise compensation method 700 is implemented, for example, in the optical device 110 of FIG. 1, the transmitter module 200 of FIG. 2 or the transmitter module 300 of FIG. 3. The OTDR-modulated OSC signal c(t) is fed into the optical fiber under test. In one example, c(t) is (1+OTDR(t))*OSC(t). To recover the fiber loss function ƒ(t) as expressed in Equation (8), the returned light signal r(t) is monitored (710). For example, the waveform of r(t) is monitored by the monitor 226 of FIGS. 2 and 3. To obtain the modified code signal c'(t) that is expressed in Equation (7), the OTDR-modulated OSC signal output from the transmitter is monitored (720), which is expressed as c(t)d(t) in Equation (9). For example, the waveform of the OTDR-modulated OSC signal is monitored by the detector 224 of FIG. 2 or the detector 310 of FIG. 3. g(t) expressed by Equation (9) is computed by using the monitored OTDR-modulated OSC signal (730). Time-domain functions g(t) and c(t) are then transformed to G(ω) and C(ω) in the frequency domain (740). Then G'(ω) is computed as expressed by Equation (14) (750). G'(ω) is then transformed to g'(t) (760). As a result, modified code c'(t) is computed by using Equation (7) (770), and the fiber loss function ƒ(t) is then computed by using Equation (6) (780).

The impact of the transmitter noise may be increased by the so-called end reflection at zero distance due to cross-talk inside the OSC module with integrated OTDR (e.g., transmitter module 200 of FIG. 2, transmitter module 300 of FIG. 3). If there exists a large amount of cross-talk in the OSC module with integrated OTDR, the cross-talk leads to a large near-end reflection peak and low dynamic range on the OTDR trace. Using the transmitter noise compensation shown in FIG. 7, the impact of the cross talk inside the OSC module on the OTDR trace may be reduced.

Figure 8:
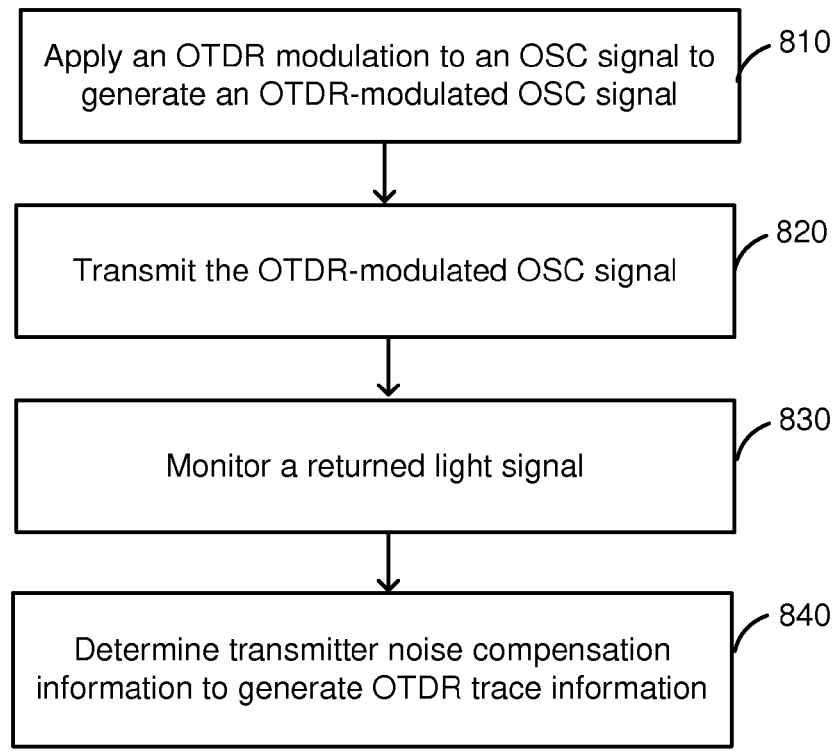
FIG. 8 is a flow diagram showing a method for an OTDR measurement providing transmitter noise compensation.

FIG. 8 illustrates an OTDR measurement method 800, which may include the transmitter compensation method 700 of FIG. 7. The measurement method 800 is implemented, for example, in the optical device 110 of FIG. 1, the transmitter module 200 of FIG. 2 or the transmitter module 300 of FIG. 3. The OTDR modulation is applied to an OSC signal (810) to generate the OTDR-modulated OSC signal. The resultant OTDR-modulated OSC signal is transmitted through an optical fiber under test (820). The returned light signal is monitored (830). Optionally, the OTDR-modulated OSC signal is also monitored. Transmitter noise compensation information can then be determined and applied to generate the OTDR trace information (840). In one embodiment, determining the transmitter noise compensation information is accomplished by computation of the modified code c'(t) to recover the fiber loss function as expressed by Equation (9).

Referring to FIGS. 7-8, the methods 700 and 800 are shown by way of example only. Some of the steps, acts or operations of the methods 700 and 800 may be conducted simultaneously or substantially in parallel or the order of the method 800 may be changed. The methods 700 and 800 may include other operations, for example, but not limited to, setting parameters of the OTDR modulation (e.g., pulse sequences, the pulse width of the OTDR signal, the OTDR modulation ratio K). The method 800 may further include other operation steps, for example, but not limited to, operations for OSC applications, switching operations modes (e.g., OSC mode, correlation mode), and/or visualization of the OTDR and/or OSC operations' results.

Figure 9A:
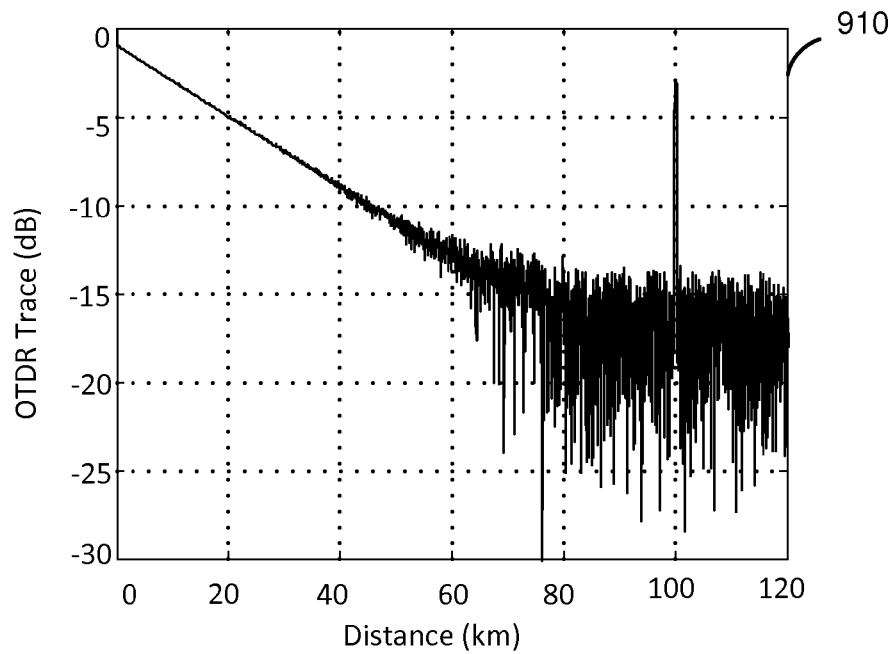
FIG. 9A illustrates a simulated OTDR trace with no transmitter noise compensation.
Figure 9B:
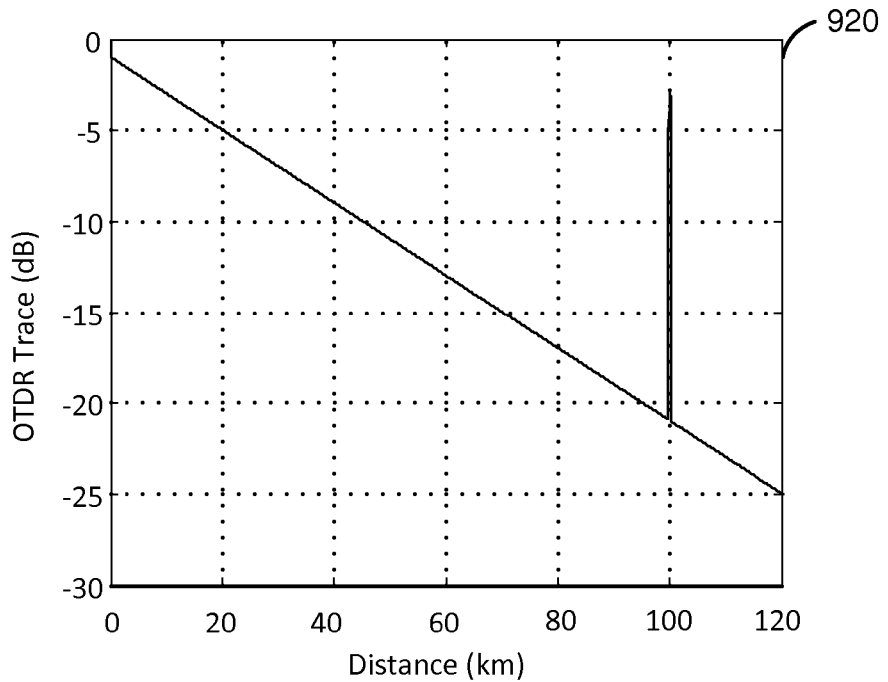
FIG. 9B illustrates a simulated OTDR trace where the transmitter noise compensation is employed and 100% transmitter noise is compensated.
Figure 9C:
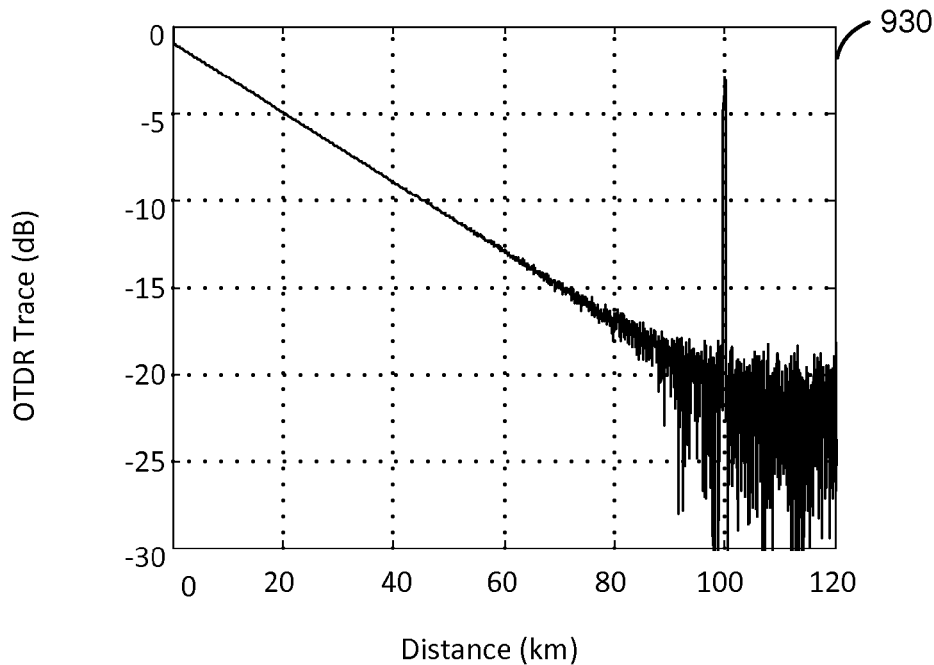
FIG. 9C illustrates another simulated OTDR trace where the transmitter noise compensation is employed and 90% transmitter noise is compensated.
Figure 9D:
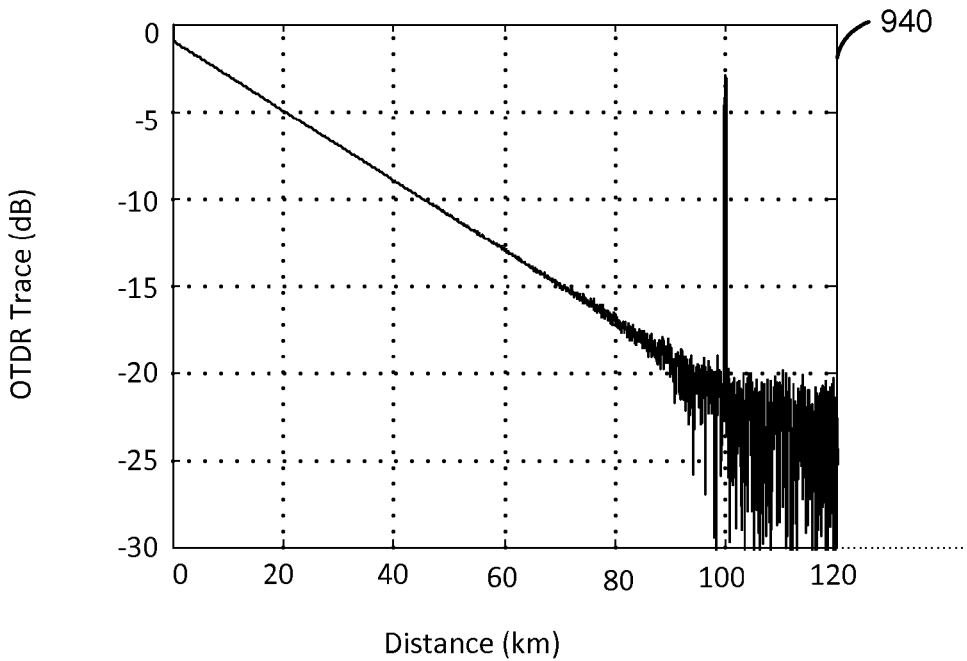
FIG. 9D illustrates a further simulated OTDR trace where the transmitter noise compensation is employed and 95% transmitter noise is compensated.

FIGS. 9A-9D illustrate examples of OTDR trace views 910, 920, 930, and 940 taken through simulations to demonstrate the effect of the transmitter noise compensation shown in FIG. 7 and FIG. 8. In FIGS. 9A-9D, the trace views show OTDR measurement results where the x-axis is a distance in the fiber, and the y-axis is the return signal strength in dB. The OTDR trace view 910 of FIG. 9A is the simulated OTDR trace with a certain amount of transmitter noise to which no transmitter noise compensation has been applied. The OTDR trace of FIG. 9A shows a peak at 100 km which is an emulated reflection event. The OTDR trace view 920 of FIG. 9B is the simulated OTDR trace using the same parameters as FIG. 9A in which 100% transmitter noise is theoretically compensated in the mathematical model so that the condition expressed by Equation (12) is met. The OTDR trace view 930 of FIG. 9C is the simulated OTDR trace to which the transmitter noise compensation shown in FIG. 7 has been applied, and 90% transmitter noise is compensated, which may occur, for example, where the transmitter signal detection circuit has an imperfect response, or has noise such that the detected noise is different from the actual noise, so the compensation is not perfect. The OTDR trace view 940 of FIG. 9D is the simulated OTDR trace to which the transmitter noise compensation shown in FIG. 7 has been applied, and 95% transmitter noise is compensated. Due to one or more factors (e.g., difference between the response of the monitoring circuitry and the response of the OTDR receiver) there still exits noise on the traces 930 and 940 after the compensation. However, the simulations show that the OTDR traces of FIGS. 9C-9D have lower noise floors in comparison with that of FIG. 9A, and that the dynamic range of the OTDR is improved by applying the transmitter noise compensation method, even in cases where the noise cannot be fully compensated.

Figure 10:
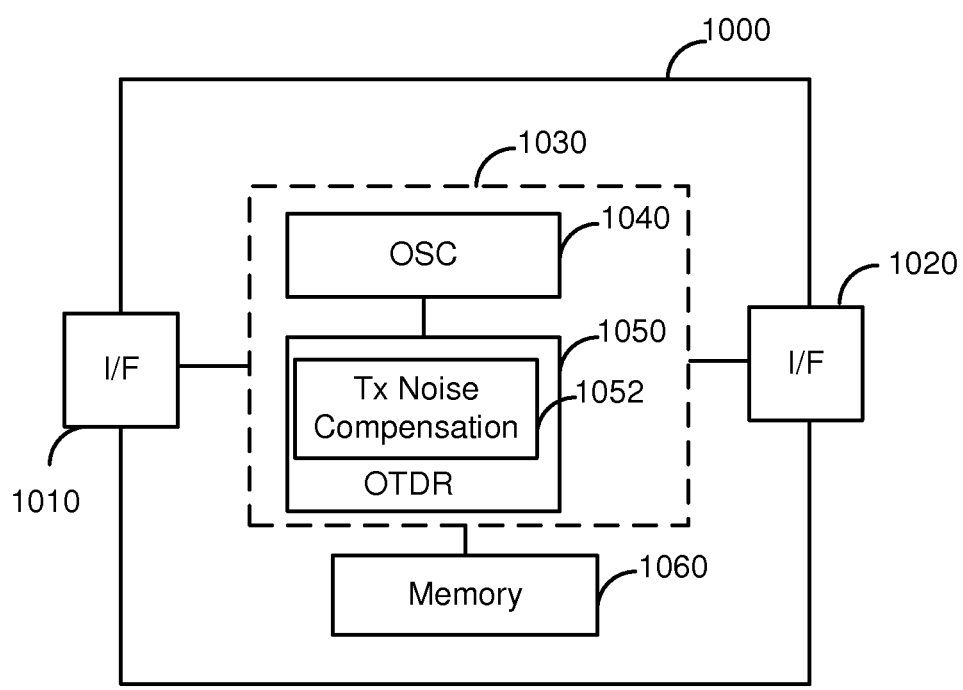
FIG. 10 is a block diagram showing a transceiver unit having an integrated OTDR used to perform transmitter noise compensation.

FIG. 10 illustrates a transceiver unit 1000, which may be any device that transmits optical signals including OSC data and which has an integrated OTDR for transmitter noise compensation. The transceiver unit 1000 may be a part of the optical device 110 of FIG. 1. The transceiver unit 1000 may be the transmitter module 200 of FIG. 2 or the transmitter module 300 of FIG. 3. The transceiver unit 1000 may be configured to implement or support any of the schemes described herein, such as OSC applications, OTDR applications, transmitter noise compensation methods (e.g., method 700 of FIG. 7), OTDR operation methods including OTDR measurements (e.g., method 800 of FIG. 8), and/or switching operation modes. The term "transmitter unit" encompasses a broad range of devices of which transceiver unit 1000 is merely an example. The transceiver unit 1000 is included for purposes of clarity of discussion, but is in no way meant to limit the application of the present disclosure to a particular transceiver unit embodiment or class of transceiver unit embodiments. The features/methods in the disclosure may be implemented using hardware, firmware, and/or software installed to run on hardware. The transceiver unit 1000 may be a SFP transceiver. As shown in FIG. 10, the transceiver unit 1000 may include interfaces 1010, 1020. The transceiver unit 1000 may be communicatively connected to at least one of a display and user interfaces for operation of the transceiver unit 1000 and other components (e.g., optical fibers, SFPs, or another external device) using the interfaces 1010, 1020. The transceiver unit 1000 may include a module 1030 which may communicate with the interfaces 1010, 1020. The module 1030 may include a software programmable module 1040 for OSC applications and a software programmable module 1050 for the OTDR measurement, which may be partially or entirely integrated. The module 1050 may implement the method 800 of FIG. 8. The module 1050 may implement the transmitter noise compensation 1052, which may correspond to the method 700 of FIG. 7. The transceiver unit 1000 may include a memory module 1060, which may include at least one of a cache for temporarily storing content, e.g., a Random Access Memory (RAM), a Static Random Access Memory (SRAM), and a long-term storage for storing content having a relatively longer duration or a relatively longer bit string, e.g., a Read Only Memory (ROM). For instance, the cache and the long-term storage may include Dynamic Random Access Memories (DRAMs), solid-state drives (SSDs), hard disks, or combinations thereof. The waveform of the transmitter optical signal monitored by a monitor (e.g., monitor 226 of FIG. 2, or monitor 310 of FIG. 3) may be recorded in the memory module 1060. The OSC and/or OTDR applications may be programmed using the memory module 1060. The transceiver unit 1000 may be coupled to, or include, other components, e.g., amplifiers, filters, multiplexer/de-multiplexer for multiplexing traffic data in a network with OSC data or de-multiplexing traffic data and OSC data.

Any processing of the present disclosure may be implemented by causing a processor (e.g., a general purpose CPU inside a computer system) in a computer system to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as magnetic tapes, hard disk drives, flash memory etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray™ disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires and/or optical fibers) or a wireless communication link.

The words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art, there are always minor variances that prevent the values or positions from being exactly as stated. It is to be understood that the terms so used are interchangeable under appropriate circumstances and that the embodiments described herein are capable of operation in other sequences than described or illustrated herein.

While several embodiments have been provided in the present disclosure, it may be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. A number of variations and modifications can be made without departing from the scope of the invention as defined in the claims.

What is claimed is:

1. A device for an optical network, the device comprising:
   a transmitter configured to:
      generate an Optical Time Domain Reflectometer (OTDR)-modulated optical supervisory channel (OSC) signal by applying an OTDR modulation to an optical supervisory channel (OSC) signal using an OTDR signal; and
      transmit the OTDR-modulated OSC signal through an optical fiber; and
   an OTDR module configured to:
      generate the OTDR signal;
      monitor a returned light signal from the optical fiber;
      monitor the transmitted OTDR-modulated OSC signal;
      determine transmitter noise compensation information using the transmitted OTDR-modulated OSC signal; and
      generate OTDR trace information using the transmitter noise compensation information and the monitored returned light signal.

2. The device according to claim 1, wherein the transmitter is configured to generate the OTDR-modulated OSC signal in a form of (1+OTDR(t))*OSC(t) where OTDR(t) represents the OTDR signal, and OSC(t) represents the OSC signal.

3. The device according to claim 2, wherein the OTDR module is configured to adjust an OTDR modulation ratio defined by a maximum power of OTDR(t) and a minimum power of OTDR(t).

4. The device according to claim 3, wherein the OTDR modulation ratio is in a range of 20-30%.

5. The device according to claim 1, wherein the OTDR module is configured to compute a modified code to recover a fiber loss function $f(t)$, as expressed by:

$$c'(t)=c(t)+g'(t);$$

$$f(t)=c'(t)*r(t),$$

where c'(t) is the modified code, c(t) is the OTDR-modulated OSC signal, and r(t) is the returned light signal, and wherein g'(t) meets a condition:

$$c(t)*g(t)+g'(t)*g(t)+g'(t)*c(t)=0,$$

where g(t)=c(t)d(t)−c(t), c(t)d(t) represents a monitored OTDR-modulated OSC signal, d(t)≠1.

6. The device according to claim 5, wherein the OTDR module is configured to compute g'(t) by obtaining G'(ω) in a frequency domain, wherein G'(ω) satisfies:

$$G'(\omega) = -\frac{C(\omega)G^*(\omega)}{G^*(\omega) + C^*(\omega)}$$

wherein $G^*(\omega)$ is a frequency domain variable of g(t), a superscript * of $G^*(\omega)$ is a complex conjugate, $G'(\omega)$ is a frequency domain variable of g'(t), $C(\omega)$ is a frequency domain variable of c(t).

7. The device according to claim 1, wherein the device is configured to implement an OSC application with the OTDR modulation in a correlation mode, and the device is configured to implement the OSC application without the OTDR modulation in an OSC mode.

8. The device according to claim 1, wherein the OTDR module comprises a first monitor configured to monitor the returned light signal from the optical fiber of the optical network, and a second monitor configured to monitor the transmitted OTDR-modulated OSC signal.

9. The device according to claim 8, comprising a pluggable module having a beam-splitter, the beam-splitter being communicatively coupled to the transmitter and the optical fiber, the second monitor being configured to monitor the the transmitted OTDR-modulated OSC signal using the beam-splitter.

10. The device according to claim 8, comprising a pluggable module having a beam-splitter, the beam-splitter being communicatively coupled to the transmitter and the optical fiber, the second monitor being arranged external to the pluggable module.

11. The device according to claim 1, wherein the transmitter is an OSC transmitter or an OSC transceiver.

12. A method for an optical device, the method comprising:
applying an Optical Time Domain Reflectometer (OTDR) modulation to an optical supervisory channel (OSC) signal using an OTDR signal to generate an OTDR-modulated OSC signal;
transmitting through an optical fiber the OTDR-modulated OSC signal;
monitoring a returned light signal from the optical fiber;
monitoring the transmitted OTDR-modulated OSC signal;
determining transmitter noise compensation information using the transmitted OTDR-modulated OSC signal; and
generating OTDR trace information using the transmitter noise compensation information and the monitored returned light signal.

13. The method according to claim 12, wherein determining transmitter noise compensation comprises computing a modified code c'(t) to recover a fiber loss function f(t), as expressed by:

$$c'(t) = c(t) + g'(t);$$

$$f(t) = c'(t) * r(t),$$

where c(t) is the OTDR-modulated OSC signal (1+OTDR (t))*OSC(t), OTDR(t) represents the OTDR signal, OSC(t) represents the OSC signal, r(t) is the returned light signal, and wherein g'(t) meets a condition:

$$c(t)*g(t) + g'(t)*g(t) + g'(t)*c(t) = 0,$$

where g(t)=c(t)d(t)−c(t), c(t)d(t) represents a monitored OTDR-modulated OSC signal, d(t)≠1.

14. The method according to claim 13, wherein computing g'(t) comprises:
obtaining G'(ω) meets:

$$G'(\omega) = -\frac{C(\omega)G^*(\omega)}{G^*(\omega) + C^*(\omega)}$$

where $G^*(\omega)$ is a frequency domain variable of g(t), a superscript * of $G^*(\omega)$ is a complex conjugate, $G'(\omega)$ is a frequency domain variable of g'(t), and $C(\omega)$ is a frequency domain variable of c(t).

15. The method according to claim 12, wherein applying OTDR modulation to the OSC signal comprises:
generating the OTDR-modulated OSC signal in a form of (1+OTDR(t))*OSC(t) where OTDR(t) represents the OTDR signal, and OSC(t) represents the OSC signal.

16. The method according to claim 15, comprising:
setting an OTDR modulation ratio defined by a maximum power of OTDR(t) and a minimum power of OTDR(t).

17. The method according to claim 16, wherein setting the OTDR modulation ratio comprises:
adjusting the OTDR modulation ratio in a range of 20-30%.

18. The method according to claim 12, comprising:
switching an operation mode, wherein the OTDR modulation is applied to the OSC signal in a correlation mode, and the OSC signal is transmitted without the OTDR modulation in an OSC mode.

19. The method of claim 12 wherein the OTDR modulation is one of complementary Golay codes, biorthogonal codes, simplex codes, or CCPONS (Complementary Correlated Prometheus Orthonormal Sequence).

20. A non-transitory computer-readable memory containing instructions in code which when executed by a processor of a device cause the device to:
apply an Optical Time Domain Reflectometer (OTDR) modulation to an optical supervisory channel (OSC) signal using an OTDR signal to generate an OTDR-modulated OSC signal;
transmit the OTDR-modulated OSC signal through an optical fiber;
monitor a returned light signal from the optical fiber;
monitor the transmitted OTDR-modulated OSC signal;
determine transmitter noise compensation information using the transmitted OTDR-modulated OSC signal; and
generate OTDR trace information using the transmitter noise compensation information and the monitored returned light signal.

* * * * *